United States Patent
Dawson

(10) Patent No.: US 8,346,946 B2
(45) Date of Patent: Jan. 1, 2013

(54) SYSTEM AND METHOD FOR REGISTRATION OF NETWORK-CAPABLE CONSUMER ELECTRONIC DEVICES

(75) Inventor: Thomas P. Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 120 days.

(21) Appl. No.: 12/625,066

(22) Filed: Nov. 24, 2009

(65) Prior Publication Data

US 2011/0125912 A1    May 26, 2011

(51) Int. Cl.
    *G06F 15/16*    (2006.01)
(52) U.S. Cl. .......... 709/228; 709/220; 709/221; 705/28; 705/30; 705/56
(58) Field of Classification Search .................. 709/220, 709/221, 228; 705/28, 30, 56
    See application file for complete search history.

(56) References Cited

U.S. PATENT DOCUMENTS

| | | | |
|---|---|---|---|
| 7,610,224 B2 * | 10/2009 | Spiegel | 705/28 |
| 2005/0075938 A1 * | 4/2005 | Mukai et al. | 705/24 |
| 2006/0221925 A1 * | 10/2006 | Beathard | 370/342 |
| 2007/0214356 A1 * | 9/2007 | Song et al. | 713/156 |
| 2007/0221726 A1 * | 9/2007 | Thomas | 235/383 |
| 2007/0271830 A1 * | 11/2007 | Holt et al. | 42/70.01 |
| 2008/0134307 A1 | 6/2008 | Ashkenazi et al. | |

* cited by examiner

*Primary Examiner* — Wing Chan
*Assistant Examiner* — Hitesh Patel
(74) *Attorney, Agent, or Firm* — Fitch, Even, Tabin & Flannery, LLP

(57) ABSTRACT

Manufacturer registration of consumer electronic devices includes a registration server receiving purchaser-specific information from a user computer over a network, such as the Internet. This received purchaser-specific information may then be associated with a temporary short code, which is in turn provided back to the user computer over the network. The purchaser is then free to input the provided temporary short code into the consumer electronic device to be registered, after which both the short code and certain additional device-specific identification information may be provided directly by the consumer electronic device to the registration server over a network connection. The provided short code may then be matched to the previously-provided purchaser-specific information, and the manufacturer registration process completed using both the purchaser-specific information and the device-specific identification information.

18 Claims, 2 Drawing Sheets

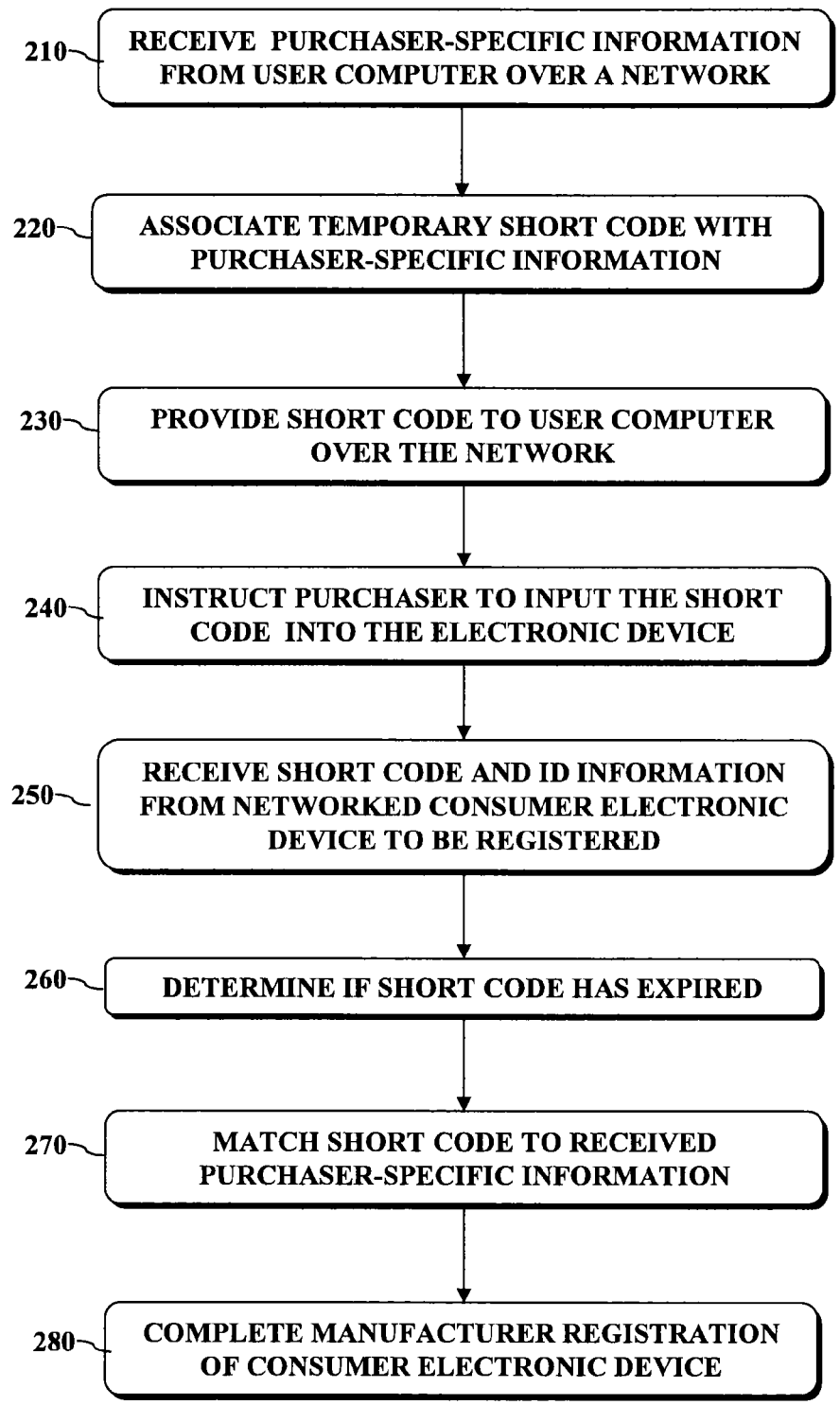

SYSTEM AND METHOD FOR REGISTRATION OF NETWORK-CAPABLE CONSUMER ELECTRONIC DEVICES

FIELD OF THE INVENTION

The present invention relates in general to registration of new consumer electronics, and in particular to an improved approach to manufacturer registration of new consumer electronics that are network-capable.

BACKGROUND

Most consumer electronics are required to be registered with their respective manufacturers shortly after being purchased. This process is often required for setting up warranties, receiving updates and/or recall notices. However, the process for registering Internet-capable consumer electronics with their respective manufacturers can be quite burdensome. First, it is often necessary to associate the individual product with a user or user account. And given the number of product models and volume of production, the amount of information needed to uniquely identify an individual product can be very cumbersome and typically involves providing a long registration value corresponding to the particular product being registered. The process can be particularly cumbersome when the customer has to use a hand-held input device, such as a TV remote control, to enter a long registration value into the TV.

Thus, what is needed is an improved system and method for performing manufacturer registration of network-capable consumer electronics.

BRIEF SUMMARY OF THE INVENTION

Disclosed and claimed herein are methods and systems for registering consumer electronics with their respective manufacturers. In one embodiment, a method for performing manufacturer registration of consumer electronic devices comprises receiving purchaser-specific information from a user computer over a network, where the purchaser-specific information corresponds to a purchaser of a consumer electronic device to be registered. The method further includes associating a temporary short code with the received purchaser-specific information, and then providing the temporary short code to the user computer over the network as part of the registration process. In addition, the method includes receiving the short code and device-specific identification information from the consumer electronic device over the network, matching the short code to the purchaser-specific information, and finally completing the manufacturer registration of the consumer electronic device using the purchaser-specific information and the device-specific identification information.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is one embodiment of a process for carrying out one or more aspects of the invention.

DETAILED DESCRIPTION OF EXEMPLARY EMBODIMENTS

Disclosure Overview

Figure 1:
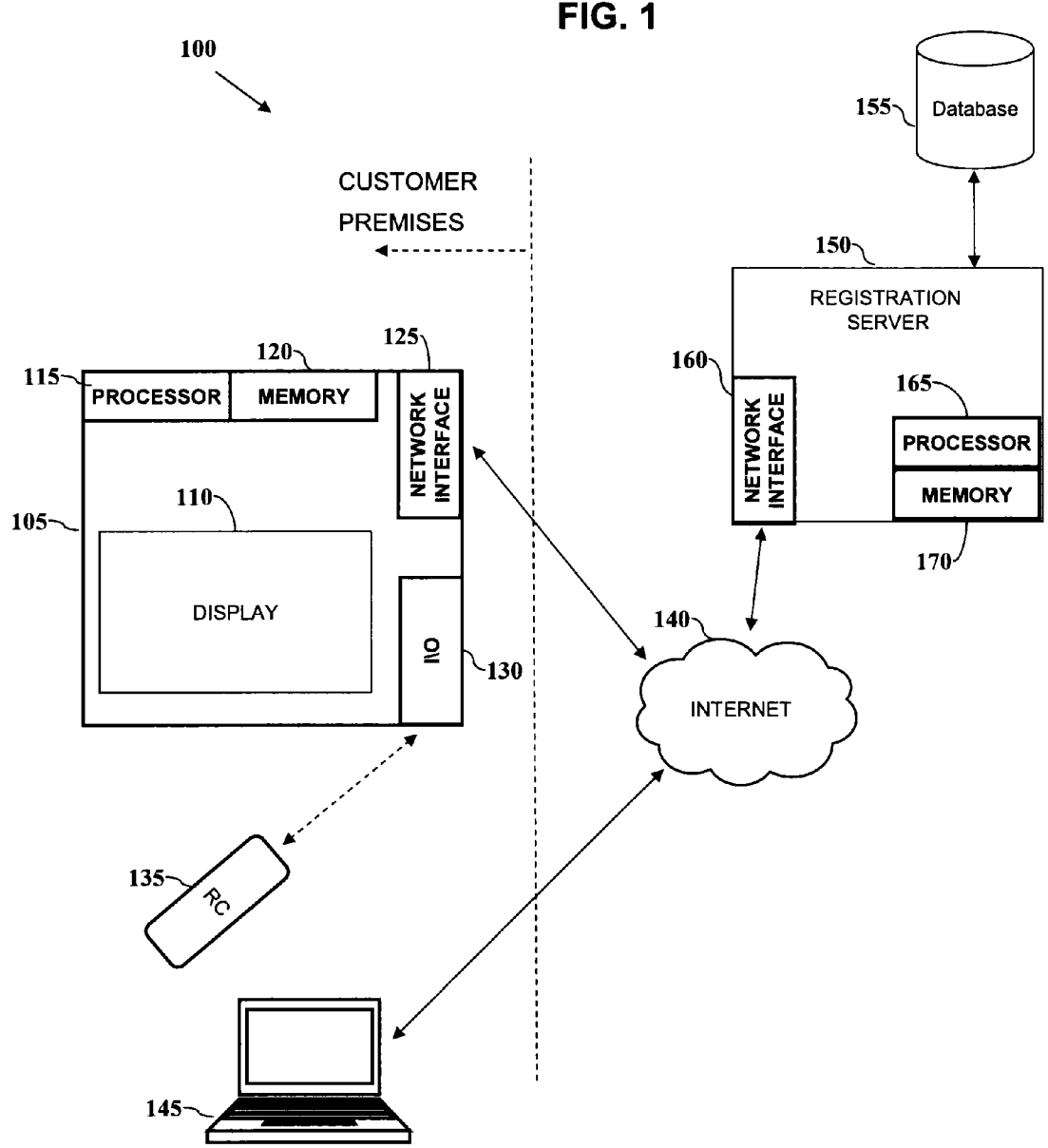
FIG. 1 is a block diagram of a system configured in accordance with one embodiment of the invention.

One aspect of the present disclosure relates to performing manufacturer registration of consumer electronic devices without the drawbacks of prior art approaches. Specifically, the process begins with the purchaser of a consumer electronic device initiating the manufacturer registration process. During the registration process, purchaser-specific information will be received from the purchaser's user computer over a network, such as the Internet. This received purchaser-specific information may then be associated with a temporary short code, which is in turn provided back to the user computer over the network.

In certain embodiments, the purchaser may then be instructed to input the provided temporary short code into the consumer electronic device to be registered, such as by using a remote control-type device. The consumer electronic device may be placed in a registration mode prior to entering the temporary short code. Thereafter, both the short code and certain additional device-specific identification information may be received from the consumer electronic device over a network connection. This short code may then be matched to the previously-provided purchaser-specific information, such as for example by performing a database lookup-type operation. The manufacturer registration process may then be completed using both the purchaser-specific information and the device-specific identification information.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the processor-executable code segments to perform the necessary tasks. The code segments can be stored in a "processor readable medium," which includes any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

Exemplary Embodiments

The present disclosure relates to the fact that most consumer electronics, such as TVs, are required to be (or benefit from) being registered with the manufacturer, referred to as manufacturer registration. Moreover, many modern consumer electronics, including TVs, are Internet-capable.

To that end, FIG. 1 depicts a system 100 configured in accordance with the principles of the invention. In particular, system 100 includes a consumer electronic device in the form of an Internet-capable television ("TV") 105. The TV 105 includes a display portion 110, a processor 115, a memory 120, a network interface 125 and a plurality of input/output interfaces 130. An input device, such as remote control 135, may be used to provide various inputs to the TV 105 via one or more of the I/0 interfaces 130. In one embodiment, the network interface 125 is configured to connect the TV 105 to the Internet 140.

In one embodiment, the processor 115, which may be implemented as one or more separate processors, is configured to control the functionality of the TV 105, including displaying various messages associated with the registration process. Memory 120 may contain executable instruction sequences for operating and controlling the TV.

Continuing to refer to FIG. 1, also depicted is a user computer 145, which can be any Internet-capable computer that can access web pages via a browser-type application or graphical user interface. Each of the user computer 145 and TV 105 are located on the customer premises, and are able to communicate with a registration server 150 over the Internet 140. The registration server 150 may also be associated with one or more databases (i.e., database 155), which may contain user-specific information and/or device-specific information. Moreover, each of the user computer 145 and TV 105 are configured to access the Internet 140 using separate connection, or a shared connection (e.g., wireless LAN).

The registration server 150 may further comprise its own network interface 160, processor 165 and memory 170. The network interface 160 may be configured to connect the server 150 to the Internet 180, or any other network. The memory may contain processor-executable instructions, which when executed by processor 165, cause the server 150 to perform the process detailed below with respect to FIG. 2.

Referring now to FIG. 2, depicted is one embodiment of a process for registering a consumer electronic device (e.g., TV 110 of FIG. 1) by the consumer. In certain embodiments, process 200 is to be performed by a manufacturer's registration server, such as registration server 150 of FIG. 1. While the registration server may preferably be associated with the manufacturer of the device to be registered, in other cases the registration process may not be performed by or on behalf of the manufacturer.

Process 200 begins at block 210 with the receiving of purchaser-specific information over the Internet 140 by the registration server, where such purchaser-specific information was provided via the purchaser's computer (e.g., user computer 145), for example using a web browser-type application. It should be appreciated that numerous and varied devices and network connections (all of which are within the scope of the invention) can be used to provide the purchaser-specific information at block 210. However, in the preferred embodiments, the purchaser-specific information of block 210 may not be provided by or using the electronic device that is actually being registered (i.e., TV 105).

It should be appreciated that the purchaser-specific information may include one or more of the purchaser's name, address, telephone number and/or any other information deemed appropriate for use in identifying the specific individual who is registering the device, and that such information may be stored in a database (e.g., database 155) associated with the registration server. It should further be understood that such information may be used to establish a user account, which may require a username and password. However, in certain embodiments the purchaser may not need to establish a user account in order to register the device in question.

In response to receiving the purchaser-specific information, process 200 may continue to block 220 where a temporary, purchaser-specific short code may be associated with the purchaser-specific information from block 210. While in one embodiment, the short code may be made up of 4 digits, it should equally be appreciated that more or fewer digits may be used. However, if too few digits are used, the same short codes may inadvertently be provided to more than one user since there may be more short code requests than available unused codes. Conversely, if too many digits are used, the process may become too cumbersome.

It should be understood that the short code that is to be associated with the purchaser at block 220 may be generated using a random number generator, or may simply be the next available code along a sequence of available codes. Additionally, the short code may be associated and stored with the user-specific information in a relational database, such as database 155.

Additionally, the short codes provided at block 220 may preferably be temporary in that they can only be validly used for registration purposes for some limited, predetermined time period (e.g., 30 minutes). Like the number of digits in the short codes, the predetermined time period should be long enough so as to minimize the chance that the same short codes may inadvertently be provided to more than one user (i.e., the entire sequence of available short codes is used before they begin to expire. Conversely, the predetermined period of time should not be too short since it may take the purchaser some time to use the provided code.

Once the association operation of block 220 is complete, process 200 may continue to block 230 where the temporary short code may be provided back to the purchaser from the registration server via the purchaser's user computer (e.g., user computer 145).

Once the purchaser has been provided with the short code, process 200 may continue to block 240 where the purchaser may be instructed to continue the registration process by inputting the short code directly into the consumer electronic device. While in certain embodiments it may be necessary to first enter a registration or setup mode of the electronic device being registered, it should be appreciated that numerous other configurations would be consistent with the invention, such as for example having the consumer electronic device automatically prompt the purchaser for the registration code upon being powered up for the first time. In any event, the short code may be provided by the purchaser using an input device, such as remote control 135.

Regardless of how the purchaser is prompted by the consumer electronic device to provide the short code, or how the code is provided by the purchaser, once the short code has been entered by the purchaser, the device to be registered may then preferably upload the provided short code, along with a unique identification number or information, to the registration server. The unique identification information may be a value that was programmed into the memory (e.g., memory 120) of the device at the time of manufacture. The identification number or information may also be stored in a registration database (e.g., database 155), and associated or correlated to the device's type, make, model, date of manufacture, location of manufacture, etc.

Continuing to block 250, the registration server may receive the short code, along with unique identification information, directly from the device to be registered over a network connection (e.g., Internet 140).

Additionally, the registration server may determine whether or not the code has expired (block 260). In one embodiment, this may be done by comparing the time when the code is received from the electronic device to when the code was provided to the user (at block 230). If this amount of elapsed time exceeds a predetermined period of time (e.g. 30 minutes), the short code may be deemed to have expired, in which case the registration server may transmit a notice to the user via the electronic device indicating such. It should further be appreciated that the registration server may also verify that the provided short code is a valid code (e.g., along the sequence of possible codes).

If, on the other hand, the short code has not expired and is otherwise valid, then process 200 may continue to block 270 where the short code can be matched to the previously-received purchaser-specific information from block 210. Recall that at block 220 the short code was associated with purchaser-specific information. Thus, at block 270 the short code in question can be used to lookup or otherwise access the purchaser-specific information received above at block 210. For example, this operation may be done by performing a lookup operation of the registration server's database (e.g., database 155).

Once the received short code has been matched to particular purchaser-specific information, process 200 may continue to block 280 where the registration process for the consumer electronic device may be completed, and the device formally registered to its owner. In certain embodiments, registering the consumer electronic device to its particular owner enables warranty claims to be processed, software updates to be provided and/or recall notices to be sent. In this fashion, any Internet-enabled consumer electronic device may be registered without the need for the user to remember a long reference value having many digits, or to use a remote control-type device to cumbersomely input such long values.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for performing manufacturer registration of consumer electronic devices comprising:
    receiving, by a server, purchaser-specific information from a user computer over a network, wherein the purchaser-specific information corresponds to a purchaser of a consumer electronic device to be registered;
    associating, by the server, a temporary short code with the purchaser-specific information;
    providing, by the server, the temporary short code to the user computer over the network based on the purchaser-specific information received by the server and following said associating of the temporary short code with the purchaser-specific information;
    receiving, by the server, the temporary short code and device-specific identification information from the consumer electronic device over the network;
    determining whether the temporary short code has expired;
    matching, by the server, the temporary short code received with the device-specific identification information from the consumer electronic device to the purchaser-specific information; and
    completing, by the server, manufacturer registration of the consumer electronic device using the purchaser-specific information and the device specific identification information;
    wherein the receiving the purchaser-specific information comprises receiving the purchaser-specific information from the user computer over a first network connection; and
    wherein the receiving the temporary short code and device-specific information comprises receiving the temporary short code and device-specific information from the consumer electronic device over a second network connection.

2. The method of claim 1, further comprising selecting the temporary short code from a predetermined sequence of possible codes.

3. The method of claim 1, wherein the receiving the temporary short code comprises receiving the temporary short code from the consumer electronic device following the purchaser inputting the temporary short code into the consumer electronic device.

4. The method of claim 1, wherein the determining comprises comparing an amount of time that has elapsed since the providing the temporary short code to the user computer to a predetermined period of time.

5. The method of claim 1, wherein the user computer comprises one of a personal computer, laptop, personal digital assistant and smartphone.

6. The method of claim 1, wherein the purchaser-specific information comprises one or more of a purchaser name, address and telephone number.

7. The method of claim 1, wherein the temporary short code comprises between 3 and 6 digits.

8. The method of claim 1, further comprising instructing the purchaser, via the user computer, to input the temporary short code into the consumer electronic device.

9. The method of claim 1, further comprising, prior to the receiving the purchaser-specific information, receiving a request for manufacturer registration of the consumer electronic device.

10. A registration server comprising:
    a network interface;
    a memory containing computer-executable instructions; and
    a processor coupled to the memory and the network interface, wherein the processor is configured to execute the computer-executable instructions to:
        receive purchaser-specific information via the network interface from a user computer over a network, wherein the purchaser-specific information corresponds to a purchaser of a consumer electronic device to be registered;
        associate a temporary short code with the purchaser-specific information;

provide the temporary short code to the user computer via the network interface over the network based on received purchaser-specific information received and following association of the temporary short code with the purchaser-specific information;

receive the temporary short code and device-specific identification information from the consumer electronic device via the network interface over the network;

determine whether the temporary short code has expired;

match the temporary short code received with the device-specific identification information from the consumer electronic device to the purchaser-specific information; and complete manufacturer registration of the consumer electronic device using the purchaser-specific information and the device-specific identification information;

wherein the purchaser-specific information is received from the user computer over a first network connection;

wherein the temporary short code and device-specific information is received from the consumer electronic device over a second network connection.

11. The registration server of claim 10, wherein the processor is further configured to execute the computer-executable instructions to select the temporary short code from a predetermined sequence of possible codes.

12. The registration server of claim 10, wherein the temporary short code is input into the consumer electronic device by the purchaser.

13. The registration server of claim 10, wherein the processor is configured to execute the computer-executable instructions to determine if the temporary short code has expired by comparing an amount of time that has elapsed since the providing the temporary short code to the user computer to a predetermined period of time.

14. The registration server of claim 10, wherein the user computer comprises one of a personal computer, laptop, personal digital assistant and smartphone.

15. The registration server of claim 10, wherein the purchaser-specific information comprises one or more of a purchaser name, address and telephone number.

16. The registration server of claim 10, wherein the temporary short code comprises between 3 and 6 digits.

17. The registration server of claim 10, wherein the processor is further configured to execute the computer-executable instructions to instruct the purchaser, via the user computer, to input the temporary short code into the consumer electronic device.

18. The registration server of claim 10, wherein the processor is further configured to execute the computer-executable instructions to receive a request for manufacturer registration of the electronic device prior to the receiving the purchaser-specific information.

* * * * *